US009546547B2

(12) United States Patent
Mohamadi

(10) Patent No.: US 9,546,547 B2
(45) Date of Patent: Jan. 17, 2017

(54) MONITORING OF WELLS TO DETECT THE COMPOSITION OF MATTER IN BOREHOLES AND PROPPED FRACTURES

(71) Applicant: Farrokh Mohamadi, Newport Beach, CA (US)

(72) Inventor: Farrokh Mohamadi, Newport Beach, CA (US)

( * ) Notice: Subject to any disclaimer, the term of this patent is extended or adjusted under 35 U.S.C. 154(b) by 0 days.

(21) Appl. No.: 14/949,476

(22) Filed: Nov. 23, 2015

(65) Prior Publication Data

US 2016/0076366 A1 Mar. 17, 2016

Related U.S. Application Data

(63) Continuation of application No. 13/872,049, filed on Apr. 26, 2013, now Pat. No. 9,201,157.

(60) Provisional application No. 61/638,983, filed on Apr. 26, 2012.

(51) Int. Cl.
*E21B 47/12* (2012.01)
*G01V 3/30* (2006.01)
*E21B 43/267* (2006.01)
*E21B 47/10* (2012.01)

(52) U.S. Cl.
CPC ........... *E21B 47/122* (2013.01); *E21B 43/267* (2013.01); *E21B 47/1015* (2013.01); *G01V 3/30* (2013.01)

(58) Field of Classification Search
CPC ........ E21B 43/26; E21B 43/267; E21B 47/00; E21B 47/122; E21B 47/1015; G01V 3/30
See application file for complete search history.

(56) References Cited

U.S. PATENT DOCUMENTS

| 4,432,078 A * | 2/1984 | Silverman | G01V 1/133 166/249 |
| 4,714,114 A * | 12/1987 | Jones | E21B 43/267 166/280.1 |
| 4,858,130 A * | 8/1989 | Widrow | E21B 43/26 166/250.09 |
| 4,926,940 A * | 5/1990 | Stromswold | E21B 47/1015 166/247 |
| 5,413,179 A * | 5/1995 | Scott, III | E21B 43/267 166/250.12 |
| 5,442,173 A * | 8/1995 | Wraight | E21B 43/26 250/259 |
| 2002/0157824 A1* | 10/2002 | French | E21B 17/06 166/250.01 |
| 2003/0141988 A1* | 7/2003 | Stuart-Bruges | E21B 47/01 340/853.1 |
| 2004/0204856 A1* | 10/2004 | Jenkins | E21B 47/12 702/6 |
| 2005/0248334 A1* | 11/2005 | Dagenais | E21B 47/00 324/71.2 |
| 2007/0199695 A1* | 8/2007 | Hocking | E21B 43/267 166/250.1 |
| 2007/0199704 A1* | 8/2007 | Hocking | E21B 43/261 166/278 |
| 2007/0199708 A1* | 8/2007 | Hocking | E21B 43/267 166/280.2 |

(Continued)

*Primary Examiner* — Orlando Bousono
(74) *Attorney, Agent, or Firm* — Haynes and Boone, LLP

(57) ABSTRACT

There is provided a system and method for monitoring of fractured wells and conventional wells to detect leaks. The method comprises interrogating a plurality of resonant tags using a modulated RF signal transmitted from an interrogator, wherein the plurality of resonant tags are dispersed within a channel.

12 Claims, 9 Drawing Sheets

(56) References Cited

U.S. PATENT DOCUMENTS

| | | | | |
|---|---|---|---|---|
| 2007/0215345 A1* | 9/2007 | Lafferty | ............... | E21B 47/011 166/250.1 |
| 2007/0285275 A1* | 12/2007 | Purkis | ............... | E21B 34/14 340/854.6 |
| 2009/0044945 A1* | 2/2009 | Willberg | ............... | C09K 8/706 166/308.1 |
| 2009/0090505 A1* | 4/2009 | McDaniel | ............. | E21B 47/1015 166/250.1 |
| 2009/0140852 A1* | 6/2009 | Stolarczyk | ............ | H01Q 1/04 340/539.13 |
| 2009/0151938 A1* | 6/2009 | Conkle | ............ | E21B 43/26 166/254.1 |
| 2009/0205825 A1* | 8/2009 | Smith, Jr. | ............ | E21B 43/26 166/280.1 |
| 2009/0210161 A1* | 8/2009 | Duenckel | ............ | G01V 5/101 702/8 |
| 2009/0288820 A1* | 11/2009 | Barron | ............ | B01J 13/02 166/249 |
| 2010/0044034 A1* | 2/2010 | Bailey | ............ | E21B 47/12 166/253.1 |
| 2010/0066560 A1* | 3/2010 | McDaniel | ............ | E21B 43/267 340/854.9 |
| 2010/0200244 A1* | 8/2010 | Purkis | ............ | E21B 34/066 166/373 |
| 2010/0200296 A1* | 8/2010 | Camwell | ............ | E21B 47/02208 175/50 |
| 2010/0237709 A1* | 9/2010 | Hall | ............ | B60L 11/182 307/104 |
| 2010/0264747 A1* | 10/2010 | Hall | ............ | B60L 11/182 307/104 |
| 2011/0011576 A1* | 1/2011 | Cavender | ............ | E21B 33/13 166/177.1 |
| 2011/0056687 A1* | 3/2011 | Fripp | ............ | C09K 8/80 166/278 |
| 2011/0095618 A1* | 4/2011 | Schatz | ............ | H03H 7/40 307/104 |
| 2011/0163890 A1* | 7/2011 | Bowles | ............ | E21B 17/028 340/854.8 |
| 2011/0185806 A1* | 8/2011 | Pfutzner | ............ | G01V 7/06 73/152.54 |
| 2011/0188347 A1* | 8/2011 | Thiercelin | ............ | G01V 1/00 367/38 |
| 2011/0214869 A1* | 9/2011 | Beasley | ............ | E21B 43/26 166/308.1 |
| 2011/0267065 A1* | 11/2011 | Bloys | ............ | E21B 47/06 324/337 |
| 2012/0057432 A1* | 3/2012 | Hill | ............ | E21B 43/11857 367/81 |
| 2012/0080588 A1* | 4/2012 | Smith, Jr. | ............ | G01V 5/101 250/269.6 |
| 2012/0126008 A1* | 5/2012 | Binmore | ............ | G06K 19/0723 235/439 |
| 2012/0175511 A1* | 7/2012 | Masnyk | ............ | E21B 47/1015 250/259 |
| 2012/0273191 A1* | 11/2012 | Schmidt | ............ | E21B 47/122 166/250.1 |
| 2012/0273192 A1* | 11/2012 | Schmidt | ............ | E21B 47/122 166/250.1 |
| 2013/0062057 A1* | 3/2013 | Smith, Jr. | ............ | E21B 47/00 166/254.2 |
| 2013/0154847 A1* | 6/2013 | Potyrailo | ............ | H04B 5/0043 340/856.3 |
| 2013/0157713 A1* | 6/2013 | Stolarczyk | ............ | H04M 1/026 455/550.1 |

* cited by examiner

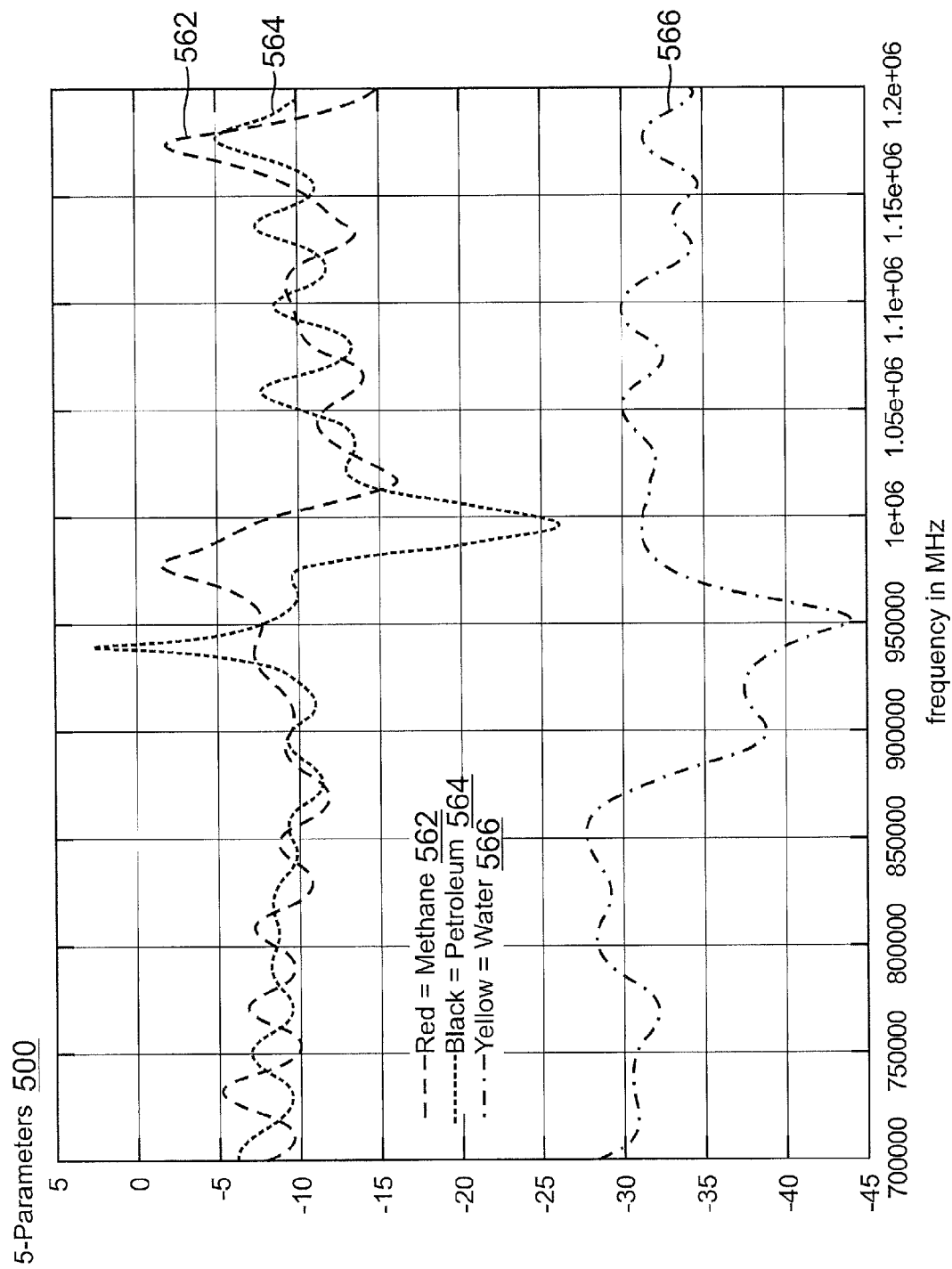

MONITORING OF WELLS TO DETECT THE COMPOSITION OF MATTER IN BOREHOLES AND PROPPED FRACTURES

RELATED APPLICATION

This application is a continuation of co-pending U.S. patent application Ser. No. 13/872,049, filed Apr. 26, 2013, and claims the benefit of priority of that application, which claims the benefit of U.S. Provisional Application No. 61/638,983, filed Apr. 26, 2012.

TECHNICAL FIELD

The present disclosure relates to interrogation of proppants, and more particularly to a monitoring system using resonant proppants to detect the composition of matter within boreholes and propped fractures.

BACKGROUND

The use of proppants in conjunction with the hydraulic fracturing of shale and other "tight oil" formations has resulted in remarkable petroleum recoveries in the U.S. For example, the annual oil production in North Dakota now exceeds the production from Alaska—a striking development buttressed on the use of proppants to "prop" open the hydraulically-created fractures in the oil-bearing rock. As a result, the proppant market in the U.S. is now in the billions of dollars per year and growing.

The recovery of tight oil through the use of proppants could easily make the U.S. self-sufficient in energy or even a net exporter of petroleum. However, environmental concerns are hampering widespread use of hydraulic fracturing. In that regard, one can appreciate that many of these concerns are overblown in that the rock formations being fractured are typically thousands of feet deep whereas ground water supplies are far removed from such depths. Nevertheless, the growth of hydraulic fracturing techniques depends upon addressing and monitoring any escape of the hydraulic fracturing fluids from the fractured rock formation. For example, such escape is conceivable if a natural fault extends through the hydrocarbon-bearing rock formation being fractured up through the shallower depths from which ground water is extracted.

Existing electronics-based downhole gauges are unable to survive the increasingly high temperature conditions experienced in modern, deep oil and gas wells. Raman-OFDR optical-fiber-based sensors offer many advantages over existing downhole electronic gauges. However, the single string of optical fiber just covers a small area of the entire well volume. The problem becomes more serious for fractured wells in which the use of fiber-optics for in-situ monitoring of the fracking process is impossible.

It is not just hydraulically-fractured wells that require monitoring. For example, the Deepwater Horizon disaster in the Gulf of Mexico involved a compromised well casing. Highly-pressurized natural gas displaced sea water and drilling mud in the riser to the drilling platform and caused an explosion. The drilling platform eventually sank, leading to an environmental disaster of considerable proportions. It is believed that the cement casing failed in the Deepwater well, which led to the natural gas from the penetrated reservoir blasting through the riser to the floating drilling platform.

There is thus a need in the art for better techniques to monitor hydraulically fractured wells. Moreover, there is a need in the art for techniques to monitor the integrity of well casings.

SUMMARY

To address the aforementioned needs, a system for mapping resonant tags is disclosed. In certain implementations, the resonant frequencies for the resonant tags may change in response to pressure and/or temperature changes. Additionally, in implementations of the present disclosure, the system is configured to determine a strength or power of a reflection signal from a resonant tag. A profile for expected signal strength from a resonant tag at a given range may thus be developed. Based upon this profile, the channel between an interrogator and a resonant tag may be characterized. In particular, expected signal strength from a resonant tag at a given range depends strongly on the dielectric constant for the material filling the channel between the interrogator and the resonant tag. For example, if the cement fails between an inner and outer casing, hydrocarbons from the surrounding rock layers may penetrate into the borehole in the inner casing. Should the borehole be filled with drilling mud or sea water, the entering hydrocarbons will change the dielectric constant for the channel between an interrogator within the borehole and the resonant tags on a borehole-side wall of the inner casing. Similarly, a propped fracture also acts as a channel between the interrogator and resonant tags within the propped fractures. The interrogator may be aligned with the casing perforation used to form the propped fracture so that resonant tags within the propped fracture may be interrogated. If the propped fractures are ordinarily filled with liquid or gas hydrocarbons, the dielectric constant is fairly low. But the dielectric constant rises sharply if fracking fluid or water is filling all or a portion of the propped fracture. The signal strength from an interrogated resonant tag may thus be used to characterize the medium between an interrogator and the interrogated resonant tag, regardless of whether the interrogated resonant tag is in a propped fracture or on a boreside-facing wall of well casing.

For a hydraulic fracking embodiment, each resonant tag may be encapsulated in resin or ceramic material sized to be approximately the same size as conventional proppants being injected into a propped fracture. The resonant tags will thus be positioned throughout a propped fracture in the same manner as the conventional proppants. In this fashion, resonant tags may be mixed with conventional proppants and hydraulically injected into a perforated well casing to hydraulically fracture a hydrocarbon bearing rock layer. The resulting fractures are propped by the conventional proppants as known in the "fracking" arts. The resonant tags may then be interrogated with an RF signal that is frequency modulated over the expected resonant frequency range.

The interrogator can time the delay between when an interrogating signal was transmitted and when a resulting reflected resonant transmission is received from an illuminated resonant tag. This delay provides the range to an illuminated resonant tag and can be useful in mapping the branches of a fractured channel. In addition, the interrogator can determine the amplitude of the response reflection signal, or the power of the signal. This amplitude can be utilized to determine a material surrounding the resonant tag. By sampling various propped fractures, an interrogator can determine a material surrounding the resonant tag based on the dielectric constant of the surrounding material. Propped fractures with anomalous amplitude readings caused by poor transmission of RF signals through the dielectric may be used to detect potential leaks of the hydraulic fracturing fluid from the fractured rock layer. The resonant tags may be entirely passive structures or may include active circuitry.

In accordance with an implementation, a system is provided that includes: a processor; and an interrogator configured to interrogate a channel using a frequency-modulated RF signal, wherein the frequency-modulated RF signal covers an expected range of resonant frequencies for resonant tags within the channel, and wherein the processor is configured to characterize a dielectric constant for a medium in the channel using resonant reflections received by the interrogator from the resonant tags in the channel.

In accordance with another implementation, a method is provided that includes: interrogating a channel using a frequency-modulated RF signal transmitted from an interrogator such that the frequency-modulated RF signal covers an expected range of resonant frequencies for interrogated resonant tags within the channel; determining a strength for reflected resonant signals from the interrogated resonant tags; and characterizing a dielectric constant for a medium filling the channel using the determined signal strengths.

This summary is provided to introduce a selection of concepts in a simplified form that are further described below. This summary is not intended to identify key features or essential features of the claimed subject matter, nor is it intended to be used to limit the scope of the claimed subject matter. Other features, details, utilities, and advantages of the present invention will be apparent from the following more particular written description of various embodiments of the invention as further illustrated in the accompanying drawings and defined in the appended claims.

BRIEF DESCRIPTION OF THE DRAWINGS

The present disclosure, both as to its organization and manner of operation, may be understood by reference to the following description, taken in connection with the accompanying drawings, in which:

FIG. 5 is a graph of received reflections from interrogating resonant tags in different materials.

DETAILED DESCRIPTION

Figure 1A:
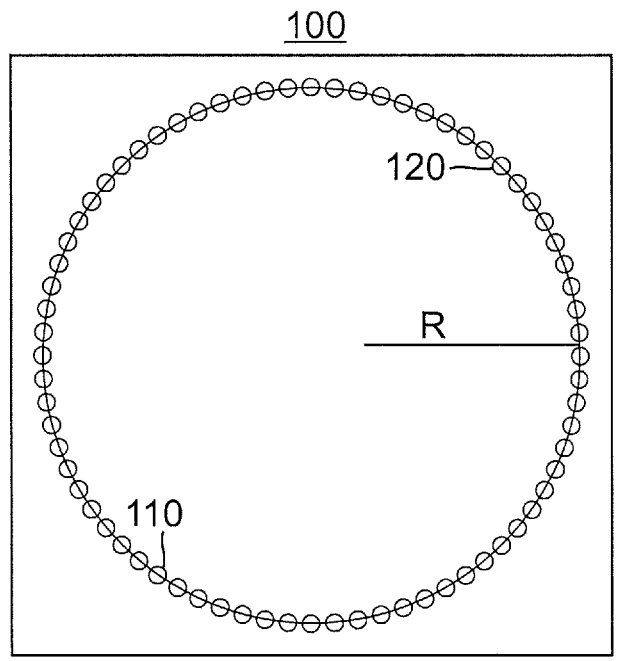
FIG. 1A is a cross-sectional view of a resonant cylindrical array structure with high Q factor.

A system for interrogating proppants is now disclosed, wherein the proppants are responsive to a modulated RF signal in an expected range. As taught in U.S. application Ser. No. 13/865,864, filed Apr. 18, 2013, titled "Interrogation of Active and Passive Proppants for Real-Time Monitoring of Fractured Well," which is hereby incorporated by reference, resonant tags (either passive or active) may be mixed with conventional proppants and hydraulically injected into the to-be-fractured rock formations at sufficient pressures to fracture the rock as known in the hydraulic fracturing (also known as fracking) arts. Regardless of whether an active or passive embodiment is used, a user has the ability to directly monitor the conditions within the propped fractures. For example, the reflection signal received from the proppants in response to their interrogation with an RF signal from an interrogator may be also be received by the interrogator. By monitoring the signal strength of the received resonant tag's signal, i.e. the power or amplitude of the signal, the systems disclosed herein may characterize the dielectric constant of the material in a channel between the resonant tag and the interrogator. Depending upon the dielectric constant for the material filling the channel, the interrogating signal weakens as it propagates through the channel towards the resonant tag. Similarly, the resonant signal reflected from the interrogated resonant tag back to the interrogator also weakens depending upon the material's dielectric constant. Thus, the matter filling the channel may be characterized, which in turn can detect leaks and/or improper material in boreholes or propped fractures. In this fashion, safety is improved and environmental concerns may be addressed with regard to potential blowouts in conventional wells and also leaks from fracked wells.

In general, one can expect a borehole or a propped fracture to be filled with generally homogeneous material such as drilling mud, sea water, fracking fluid, or hydrocarbons. For example, the reflected signal strengths from resonant tags in a well's propped fractures should be relatively similar, assuming that each propped fractures is filled with hydrocarbons. Depending upon the type and phase, a hydrocarbon-filled channel will have dielectric values between I and 4 on average. However, water has a dielectric value ranging between 55.3 and 34.5 in the high temperatures encountered in such tracked wells. Thus, if the signal strength for the resonant tags in subset of the propped fractures is significantly different, a potential leak or fault line in the fractured rock, where water contamination is occurring, may be indicated. Several different resonant structures are disclosed of what is denoted herein as a "resonant tag."

Regardless of the topology for the particular resonant structure embodiment, the resulting structure needs to be sized so as to fit within a proppant-sized enclosure. In that regard, conventional spherical proppant particles have a diameter of around 100 µm to 2.4 mm. Thus, if a resonant structure is formed on a planar substrate, that substrate must have a linear extent to fit within a proppant-sized enclosure that has a diameter approximating the diameter of the proppant being injected into the well.

Figure 1B:
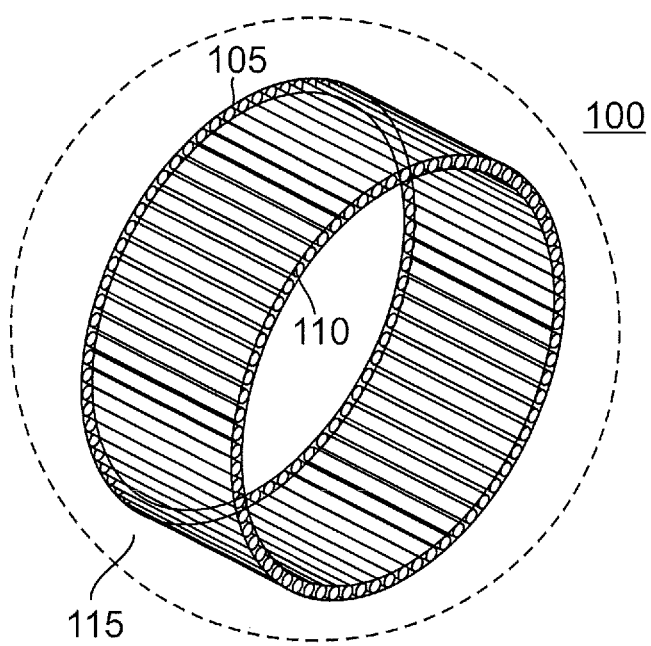
FIG. 1B is a perspective view of the resonant cylindrical array structure with high Q factor of FIG. 6A.

A resonant tag 100 that is particularly advantageous for activity in the 1 terahertz range with a high Q value is shown in FIGS. 1A and 1B. Resonant tag 100 includes a metallic cylindrical array 105 filled with a low dielectric material. In one embodiment, cylindrical array 105 has a radius R of 500 microns and a thickness of 2 microns. As seen in the cross-sectional view of FIG. 1A, array 105 includes a plurality of longitudinally extending cylinders or semi-cylinders 110. A cylinder 110 is darkened in the perspective view of FIG. 1B for illustration purposes. In one embodiment, each cylinder 110 may have a radius of 20 microns. Given these dimensions, cylinder array 105 is readily embedded in resin or ceramic material 115 to form resonant tag 100. Although tag 100 of FIG. 1A has a cube shape, other shapes such as spheres or spheroids may be used to enclose the resonant structures such as cylinder array 105. Simulation results for such an embodiment indicate advantageously high Q values such as 1,000-10,000 or higher. Other highly resonant shapes may be used to achieve such high Q values. For example, cylinders 110 may instead have a pyramidal, semi-cylindrical, or helical cross-section instead of a circular bar cross-section.

As an example, an interrogator for resonant tag 100 will transmit a series of short pulses with variable length in the 1 Thz frequency band. Based on the advantageously low dielectric constants of methane and petroleum, the propped fractures act as waveguides such that resonant tags may be mapped to tens of meters or more from the casing perforation. Using reflection signals from the interrogated resonant tags, the propped fractures may be mapped. Additionally, or alternatively, an analysis of received signals from the interrogated resonant tags can determine the presence of other material, such as water, with high dielectric constants, where the reflection signal has been significantly deteriorated due to the change in relative permittivity.

Figure 2:
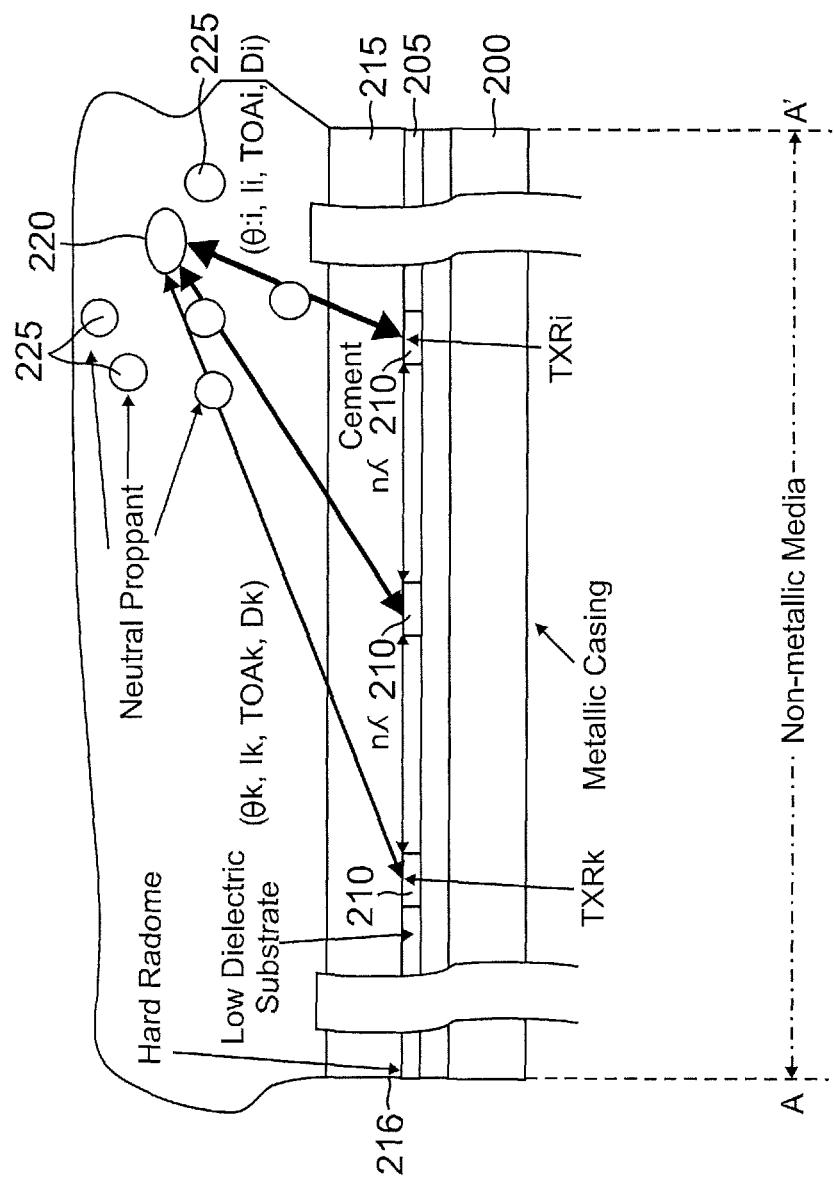
FIG. 2 is a cross-sectional view of a well bore casing configured to include a plurality of integrated interrogators.

Regardless of the particular topology used to implement a resonant tag, the corresponding interrogator may be incorporated into the well casing itself as shown in FIG. 2. A metallic casing 200 in the well bore may be coated with a low dielectric substrate 205 that contains a plurality of transmitting and receiving antenna arrays 210. A radome 216 and cement casing 215 encases arrays 210 and dielectric substrate 205. A resonant tag 220 has been injected into fractures propped by conventional (neutral) proppants 225.

Each array 210 acts as an interrogator that transmits RF energy towards resonant tag 220 and receives reflected energy from such a transmission. In one embodiment, arrays 210 may perform beam steering to scan through the hydrocarbon-bearing rock layer to detect resonant active tags buried therein. The number of interrogators is arbitrary such that a given interrogator may be designated as the kth interrogator. From the beam steering, the kth interrogator would know the beam steering angle θ used to illuminate a given resonant tag. The delay between transmission and receipt of the reflected RF energy provides the range to the illuminated resonant tag. In this fashion, an interrogator may build a three-dimensional image of the various resonant tag locations. In addition, the frequency shift based upon a pressure or temperature induced resonant frequency shift for the resonant tag enables the interrogator to know the temperature and/or pressure at the imaged tag locations.

In alternative embodiment, the interrogators may have no beam steering capabilities. Nevertheless, a roughly three-dimensional image of the resulting illuminated resonant tags may be determined from the beam widths for the interrogators. In other words, it would be assumed that received RF energy from an illuminated tag must have been from an illuminated tag within the beam width of the interrogator.

Figure 3:
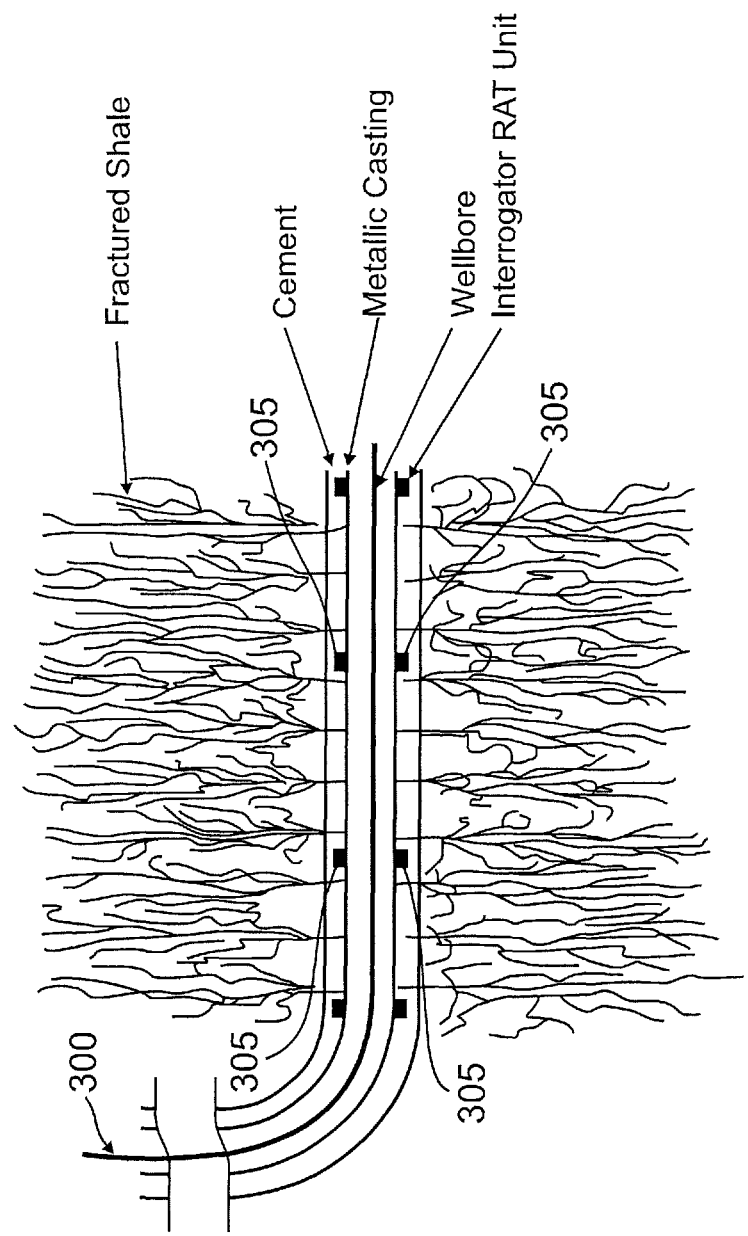
FIG. 3 is a cross-sectional view of a well bore including an actuated interrogator.

In alternative embodiments, the interrogator may be associated with an actuating device such as wire or cable that would enable an operator to "snake" the interrogator down the bore hole towards the casing perforations that enable the fracking fluid to escape into the hydrocarbon-bearing rock so as to hydraulically fracture this rock. For example, FIG. 3 illustrates a guide wire or cable 300 that may be used to position a pair of interrogators 305 so as to be adjacent a pair of opposing perforations in the well casing. These perforations are conventionally formed using a "perforating gun" that fires explosive shaped charges. The diameter of the perforation is typically from one half inch to approximately one inch in diameter. The interrogator antenna array is thus sized accordingly such that sufficient RF energy may be transmitted through the perforation towards the resonant tags within the propped fractures. After imaging through a given perforation, the guide wire may be actuated to move interrogator(s) 305 to a subsequent perforation. One can well appreciate that a perforating gun forms many such perforations in the well casing. Thus, one need not image each and every perforation but instead sample them so as to adequately image the desired resonant tags.

Figure 4A:
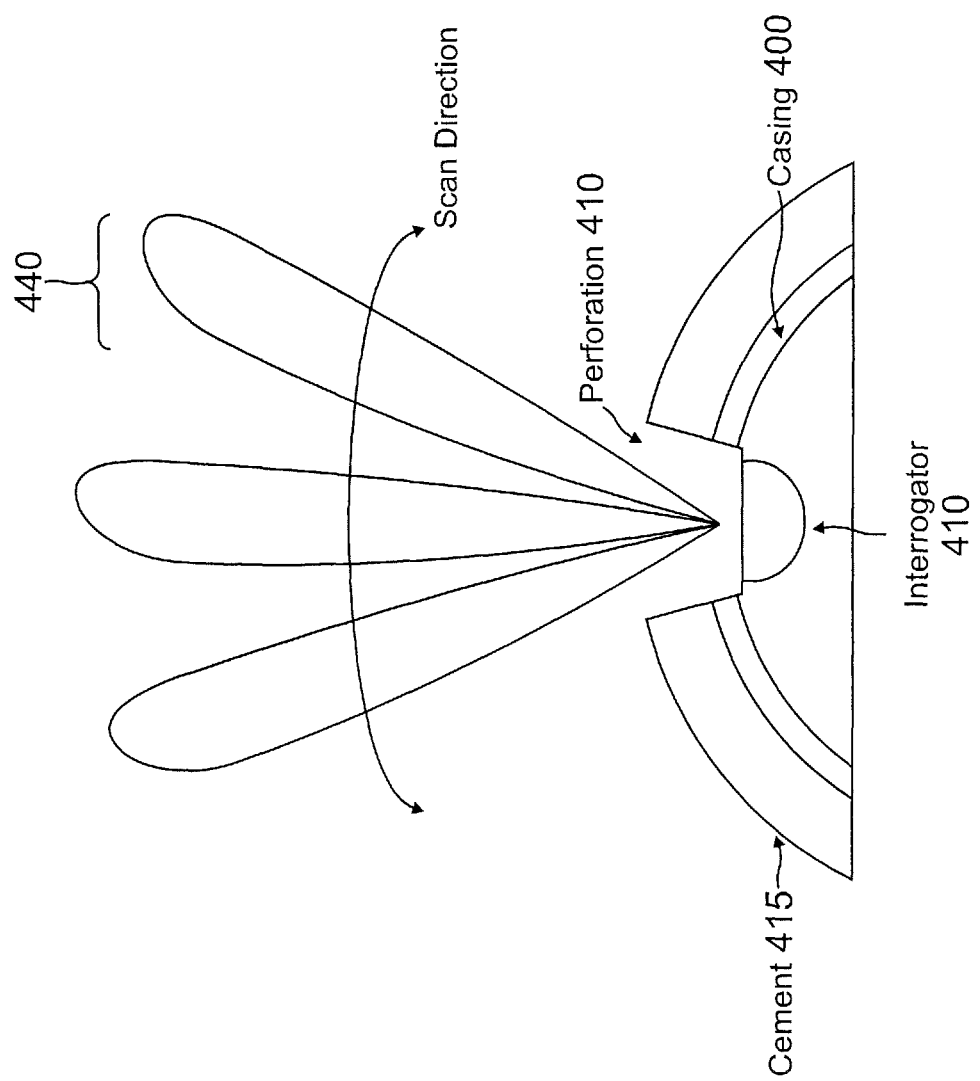
FIG. 4A is a cross-sectional view of an interrogator using beam-steering to provide directionality to interrogate resonant tags through a perforation.

FIG. 4A is a cross-sectional view of an interrogator using beam-steering to provide directionality to interrogate resonant tags through a perforation. Note that FIG. 4A presents another "side" view of a single propped "frac channel", or fractured hydrocarbon rock, for example the fractured hydrocarbon rock of FIG. 3. FIG. 4A shows an interrogator initially transmitting a beam-steered RF signal to interrogate resonant tags in the fractured rock.

In FIG. 4A, perforation 430 through casing 400 and cement 415 allows interrogator 410 to direct an RF signal through perforation 430 and into the frac channels. In order to increase power and likelihood of resonant tag response, modulated RF signal 440 is beam steered through perforation 430 as previously discussed. Note that each propped fracture acts as a waveguide. The high dielectric constant of the surrounding shale and/or rock of a channel compared to the low dielectric constant of the methane (e.g., 1.7) and petroleum (approximately 2.2) allows for transmitted waves to travel entire branches of a fractured region. Thus, transmission and reflection within such a waveguide is virtually beam-formed to follow the path of the propped fracture.

Figure 4B:
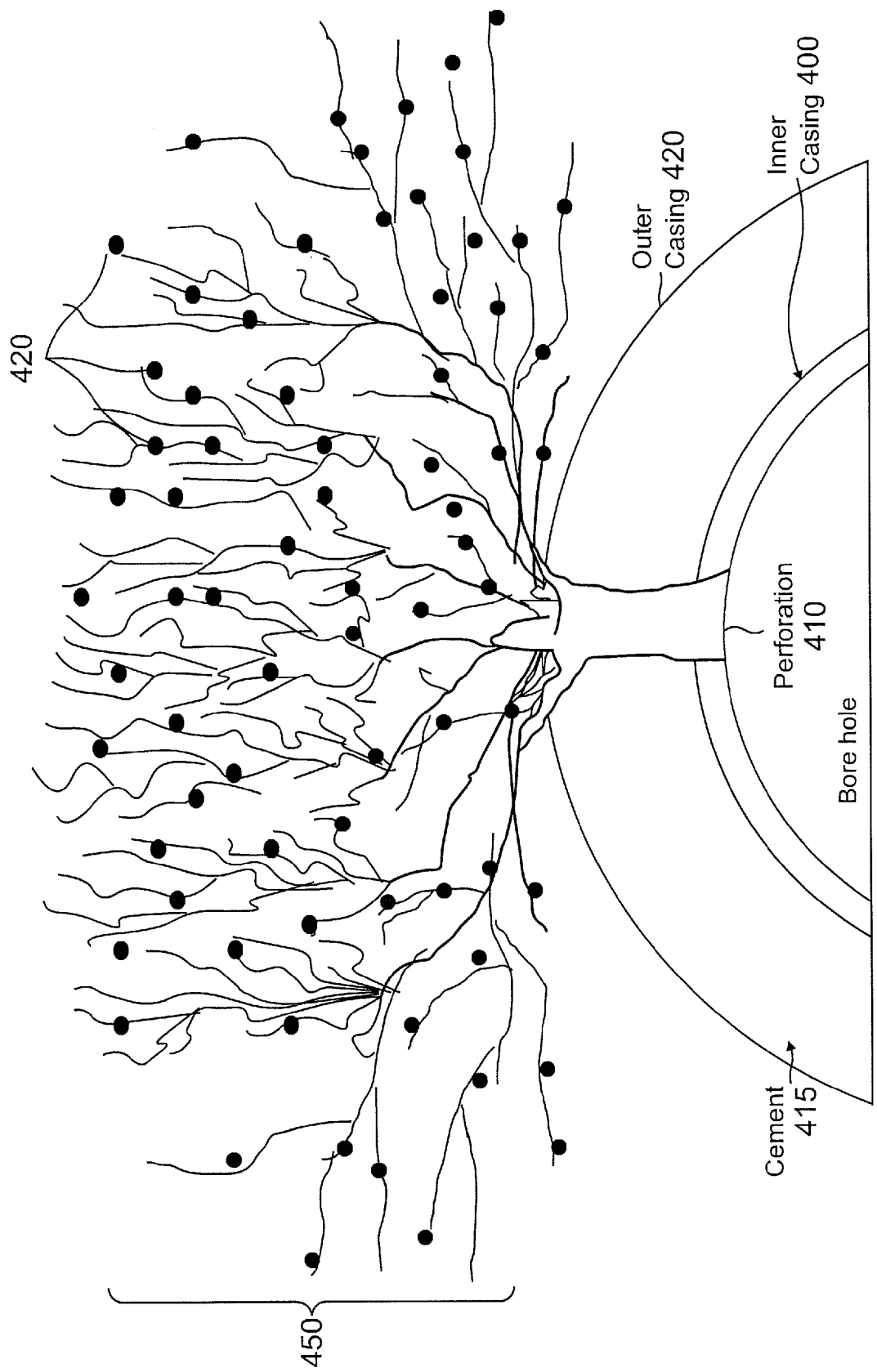
FIG. 4B is cross-sectional view of a mapped frac channel perforation with proppants dispersed in a material.

Using the resonant tag's reflection signal, FIG. 4B is cross-sectional view of a mapped frac channels. After dispersal of resonant tags 420 in the channels 450 formed by the propped fractures, an interrogator can transmit an RF signal as discussed above through perforation 4010 in casing 400 and cement 415. Using the reflection signal of resonant tags 420, the locations of resonant tags 420 may be mapped using the time of arrival and the amplitude, or power, of the reflection signals.

However, in situations where resonant tags 420 have encountered materials of different dielectric constants than expected, the reflection signal may be abnormally deteriorated compared to that received from resonant tags that have the same range in neighboring propped fractures. For example, if resonant tags 420 become surrounded by water through a crack in the well or a fault line, the amplitude of the return signal may show a significant decrease in size, and thus signal strength, comparative to the previous and/or expected value. Thus, the receiving system can determine that resonant tags 420 with deteriorated signal strength are in channels filled with material other than a hydrocarbon. In this manner, leaks in propped fractures, where faults or other water sources have been encountered, can be detected in real time.

FIG. 5 is a graph of received reflections from interrogating resonant tags in different materials. Shown in FIG. 5 is a 1 Thz transmitted signal with a 300 Ghz bandwidth. Graph 560 of FIG. 5 shows reflection signal strength of methane 562, petroleum 564, and water 566.

FIG. 5 illustrates the scattering parameter (and thus the expected signal strength) from a resonant structure, such as the resonant tag of FIGS. 1A and 1B as a function of the material filling the channel between the interrogator and the interrogated resonant tag. Curve 562 illustrates the scattering parameter for a methane-filled channel whereas curve 564 illustrates the scattering parameter for a petroleum-filled channel. However, in materials such as water, the signal strength of the reflection signal may be appreciably deteriorated. Thus, as shown by curve 566 for a water-filled channel, the expected reflected signal strength is significantly lower than that for methane 562 and petroleum 564. By recognizing the deteriorated signal, the system can determine the presence of water with the resonant tags. In this manner, water leaks and/or contamination can be determined in fractured wells.

In certain implementations, resonant tags may be active, for example including RFID technology. Resonant active tags may be energized so as to communicate in an ad hoc manner within such a virtual waveguide and link to an interrogator so that the information from the various resonant active tags may be aggregated and eventually uploaded to a database either at the well site or remotely located through the Internet. Each response from an illuminated resonant active tag may be included with a header that identifies the illuminated resonant active tag so that a three-dimensional image may be developed of temperature and pressure within a given propped fracture. The real time data then is collected at the top of the well and connected to the Internet cloud. The gathered information is then decomposed and from information of the collective sensor cluster, forms the three dimensional map of the fractured well as well as its thermal gradient, pressure gradient, flow profile, and health of link between sensors that is a sign of connectivity amongst the sensors inside the well.

Figure 6:
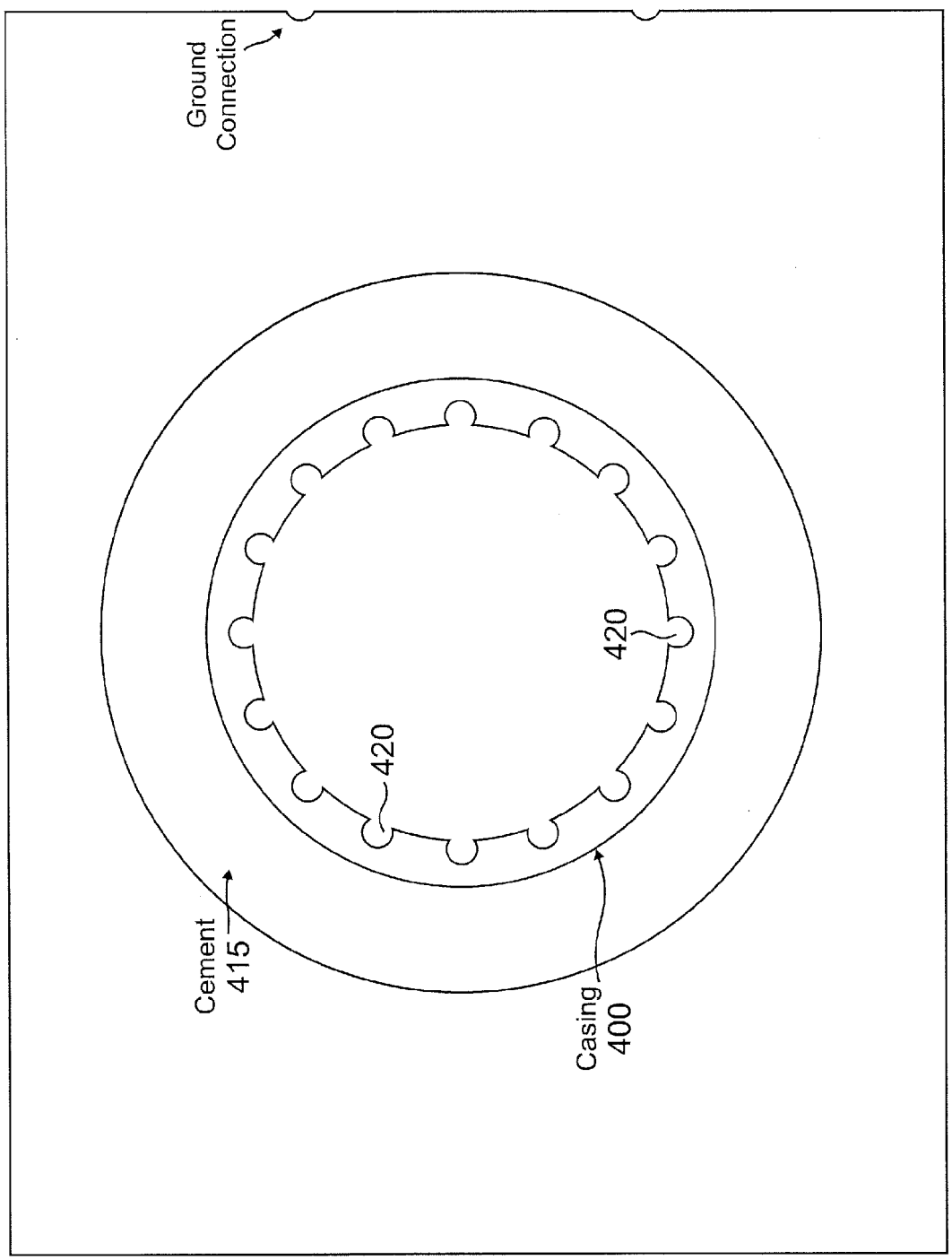
FIG. 6 is a cross-sectional view of a well casing including a plurality of resonant tags to assist in the detection of fractures in the well casing.
Figure 7:
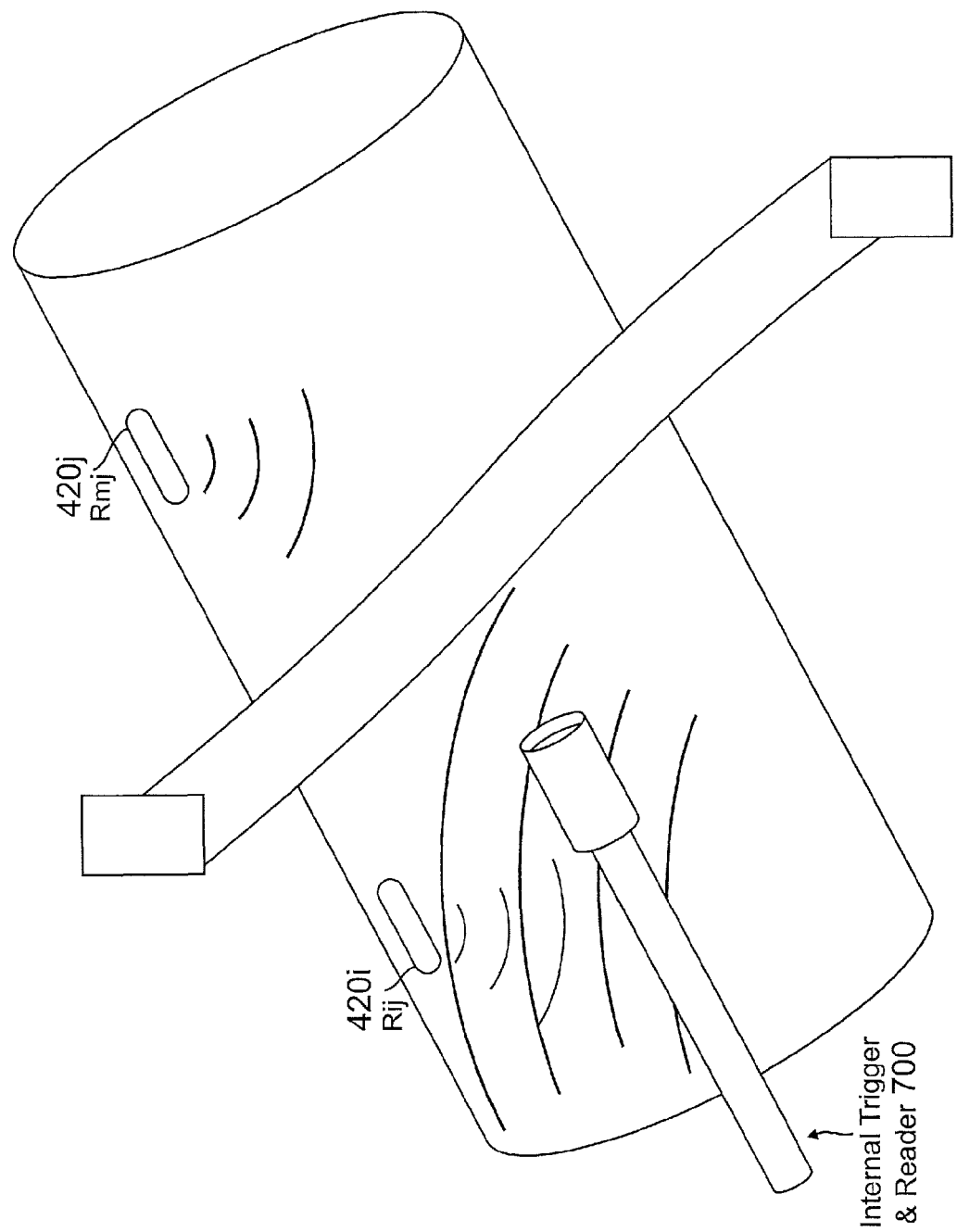
FIG. 7 illustrates an interrogator interrogating the well casing of FIG. 6 to detect regions that have been compromised.
Figure 8:
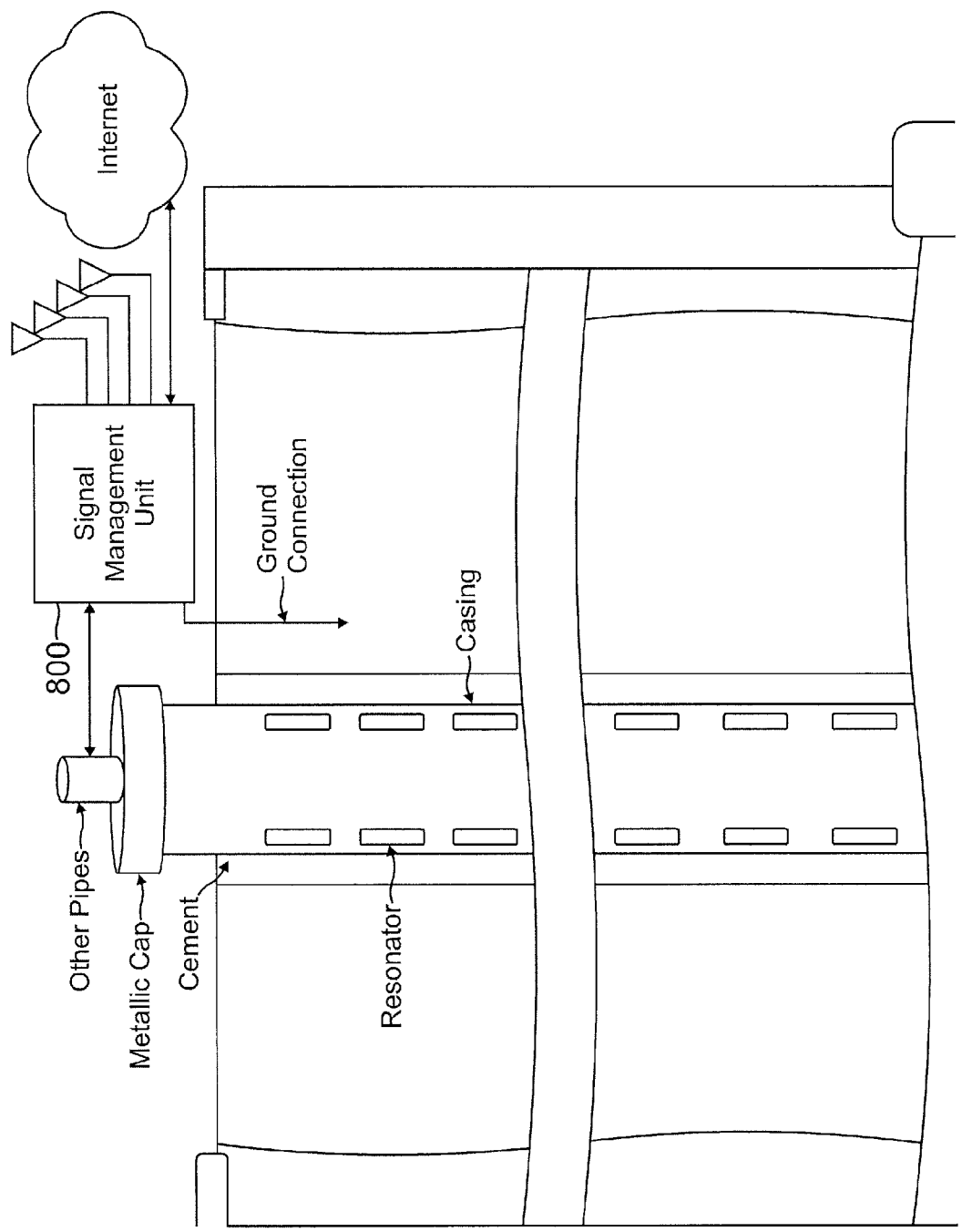
FIG. 8 illustrates a processor configured to process the signal strengths determined by the interrogator of FIG. 7 to detect the compromised regions.

FIG. 6 illustrates a cross-sectional view of a well casing 400 surrounded by cement 415, wherein the borehole-facing wall of well casing 400 includes a layer of resonant tags 420. Since these tags are not injected with proppants into a fracture, there is no need for these tags to be encapsulated to form "pseudo-proppants." For example, resonant structures such as cylinder arrays 105 of FIG. 1B may be mixed with a suitable binder so as to adhere to the borehole-facing wall of well casing 400. As shown in FIG. 7, an interrogator 700 may be lowered or advance into the borehole analogously to the lowering of a drill bit or other conventional borehole equipment. In this case, the borehole is expected to be filled with hydrocarbon. This would be the case during production. Alternatively, it may be expected that the borehole is expected to be filled with drilling mud or sea water such as during exploration. In the case of hydrocarbons filling the borehole, the channel between interrogator 700 and an ith resonant tag 420$i$ will introduce relatively little attenuation. But suppose that a jth resonant tag 420$j$ is located in a compromised portion of the well such that water is entering through the cement casing into the borehole. In this case, the channel between interrogator 700 and resonant tag 420$j$ will introduce relatively high attenuation. As shown in FIG. 8, a processor 800 associated with interrogator 700 (which may be adjacent the well at the surface or remotely located such as through an Internet connection) can thus determine if and where the well casing has been compromised.

The above specification, examples and data provide a complete description of the structure and use of exemplary embodiments of the invention as claimed below. Although various embodiments of the invention as claimed have been described above with a certain degree of particularity, or with reference to one or more individual embodiments, those skilled in the art could make numerous alterations to the disclosed embodiments without departing from the spirit or scope of this invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A system comprising:
    a processor;
    a plurality of resonant tags, wherein each resonant tag further comprises:
        a cylindrical array comprising a plurality of structures arranged to form a second hollow cylinder;
        a dielectric material configured to fill the second hollow cylinder; and
        a binder configured to adhere the filled cylindrical array to a borehole-facing wall of a well casing of an oil well borehole such that the plurality of resonant tags are adhered to the borehole-facing wall of the well casing; and
    an interrogator configured to interrogate a channel associated with the oil well borehole between the interrogator and the plurality of resonant tags adhered to the borehole-facing wall using a frequency-modulated radio frequency (RF) signal such that the frequency-modulated RF signal covers an expected range of resonant frequencies for the plurality of resonant tags adhered to the borehole-facing wall within the channel, and wherein the processor is configured to characterize a dielectric constant for a medium in the channel using signal strengths of resonant reflections received by the interrogator from the plurality of resonant tags adhered to the borehole-facing wall within the channel.

2. The system of claim 1, wherein the processor is further configured to determine a composition of matter filling the channel based upon the characterized dielectric constant.

3. The system of claim 1, wherein the processor is further configured to map a location for the plurality of resonant tags.

4. The system of claim 1, further comprising: a metallic casing disposed in the oil well borehole, wherein the metallic casing is coated with a low dielectric substrate containing at least one of the plurality of resonant tags.

5. The system of claim 1, wherein at least one of the plurality of resonant tags is configured to be resonant in the terahertz region.

6. The system of claim 1, wherein the interrogator is configured to beam form the frequency-modulated RF signal.

7. The system of claim 1, wherein the interrogator is configured to beam steer the frequency-modulated RF signal.

8. A method comprising:
    interrogating, using a frequency-modulated radio frequency (RF) signal transmitted from an interrogator, a channel associated with an oil well borehole between the interrogator and a plurality of resonant tags adhered to a borehole-facing wall of a well casing of the oil well borehole such that the frequency-modulated RF signal covers an expected range of resonant frequencies for the plurality of resonant tags adhered to the borehole-facing wall within the channel, wherein each resonant tag further comprises:
        a cylindrical array comprising a plurality of structures arranged to form a second hollow cylinder;
        a dielectric material configured to fill the second hollow cylinder; and a binder configured to adhere the filled cylindrical array to the borehole-facing wall of the well casing of the oil well borehole such that the plurality of resonant tags are adhered to the borehole-facing wall of the well casing;

determining, using a processor, signal strengths of resonant reflections received by the interrogator from the plurality of resonant tags adhered to the borehole-facing wall within the channel; and characterizing a dielectric constant for a medium in the channel using the determined signal strengths.

9. The method of claim 8, further comprising determining, using the processor, a composition of matter filling the channel based upon the characterized dielectric constant.

10. The method of claim 8, further comprising: determining, using the processor, a composition of matter for a plurality of portions of the oil well borehole using the characterized dielectric constant; and detecting, from the plurality of portions of the oil well borehole, a portion of the oil well borehole having an anomalous composition of matter compared to remaining ones of the plurality of portions of the oil well borehole.

11. A method, comprising:
advancing an interrogator through an oil well borehole to sampled locations within the oil well borehole, wherein the oil well borehole includes a well casing having a plurality of resonant tags lining a borehole-facing wall of the well casing of the oil well borehole, wherein each resonant tag further comprises:
a cylindrical array comprising a plurality of structures arranged to form a second hollow cylinder;
a dielectric material configured to fill the second hollow cylinder; and
a binder configured to adhere the filled cylindrical array to the borehole-facing wall of the well casing of the oil well borehole such that the plurality of resonant tags are adhered to the borehole-facing wall of the well casing;

at each sampled location, interrogating, using a frequency-modulated radio frequency (RF) signal transmitted from the interrogator, resonant tags at the sampled location from the plurality of resonant tags adhered to the borehole-facing wall to characterize a dielectric constant for a channel between the interrogator and the interrogated resonant tags at the sampled location such that the frequency-modulated RF signal covers an expected range of resonant frequencies for the interrogated resonant tags adhered to the borehole-facing wall within the channel by determining, using a processor, signal strengths of resonant reflections received by the interrogator from the interrogated resonant tags at the sample location; and based upon the characterized dielectric constants at each sampled locations, determining whether the well casing is compromised.

12. The method of claim 11, wherein determining whether the well casing is compromised includes determining whether the characterized dielectric constant at each sampled location indicates the presence of water within the oil well borehole.

* * * * *